United States Patent [19]

Zobre et al.

[11] Patent Number: 5,222,238

[45] Date of Patent: Jun. 22, 1993

[54] SYSTEM AND METHOD FOR SHARED LATCH SERIALIZATION ENHANCEMENT

[75] Inventors: Douglas M. Zobre, Poughkeepsie, N.Y.; Linda Djohan, West Bloomfield, Mich.

[73] Assignee: International Business Machines Corp., Armonk, N.Y.

[21] Appl. No.: 754,995

[22] Filed: Sep. 5, 1991

[51] Int. Cl.⁵ .............................................. G06F 9/46
[52] U.S. Cl. ........................... 395/650; 364/DIG. 1; 364/281.6; 364/281.4; 364/251.5
[58] Field of Search ................................ 395/650, 700

[56] References Cited

U.S. PATENT DOCUMENTS 4,847,754  7/1989  Obermarck et al. ............... 364/200
5,109,511  4/1992  Nitta et al. .......................... 395/650

Primary Examiner—Gareth D. Shaw
Assistant Examiner—A. Katbab
Attorney, Agent, or Firm—Lawrence D. Cutter

[57] ABSTRACT

A system and method for providing two or more contending processes with concurrent access to a shared resource having a primary list of elements and a list access count, with direct association between at least first and second consecutive elements each having a use counter, wherein resource access includes an obligation to perform an access completion operation. The method comprises the steps of marking the first element as ready to be deleted upon receiving a signal from a traversing one of the contending processes. Next, the first element ready to be deleted is placed on a delete list, is unchained from the primary list and is moved the delete list to an unchained list. A determination is made whether the list access counter is equal to zero: if not, the list access counter is decremented and the system waits for another contending process to access the primary list; if so, an obligation is passed to the traversing process to perform an access completion operation by: determining whether the second element's use counter is equal to zero: if not, the list access counter is decremented and the system waits for another contending process to access the primary list; if so, the first element can be released thereby completing its deletion or it can be put a free list, thereby indicating that the first element is ready to be released. Once all elements are moved from the unchained list and placed on the free list, the free list can be released in its entirety.

16 Claims, 15 Drawing Sheets

SYSTEM AND METHOD FOR SHARED LATCH SERIALIZATION ENHANCEMENT

DESCRIPTION

1. Technical Field

The invention relates to the serializations of access to shared resources among concurrent processes. More particularly, the invention relates to a system and method for providing two or more contending processes with concurrent access to a shared resource having a primary list of elements with direct association between consecutive elements, wherein resource access includes an obligation to perform an access completion operation.

2. Background Art

U.S. Pat. No. 4,847,754 to Obermarck et al. (the '754 patent), and titled "Extended Atomic Operations", is directed to a control mechanism which does not inhibit access to the chain. In exchange for the ability of free access to the chain, factions accessing the chain take on the responsibility of cleaning up the chain. This cleanup follows the principle, "last one out turns off the lights".

A full description of a conventional method for list management may be found in the section of the '754 patent titled "Second Embodiments: List Management". Also, the "Background of the Invention" section of the '754 patent describes other conventional techniques.

FIG. 1 shows an overview of the lock-free method described in the '754 patent. The method in the '754 patent assumes a multiprogramming or multiprocessing environment where a plurality of processes require use of a single resource while executing independently, where the problem of providing access to the resource is solved by serializing such access. In order to provide serialization without delaying other processes requesting access, the method grants a process access to and use of a resource after preforming an initiation operation involving one or more atomic operations that execute against a control structure. A resource status variable (RSV) is used to indicated the current status of the resource with regard to its use by other processes.

After obtaining access, as shown at step 102, a determination is made at step 104 regarding any concurrent use. If there is no concurrent use the process permits completion of the operation, as shown at step 106. Then a determination is made at step 108 to check whether the current process is the completing process. If not, obligation to clean-up the list is passed to another process that still has access to the resource, as shown at step 110. If the result at step 108 was "YES", any obligations from concurrent processes would be passed to the completing process, as shown at step 112, and the resource would be surrendered, or returned to the system, at step 114 through a completion operation executed against the RSV.

DISCLOSURE OF INVENTION

The original Shared Latch serialization processing discusses above and described in the '754 patent does not accommodate the deletion of elements from a chain when there is a direct association between consecutive elements on the chain.

A chain of elements exists such that references to a specific element were made via indirect addressing. That is, the address of element n would be obtained by first addressing element n−1's chain next pointer. This association between consecutive elements on the chain causes problems when the conventional Shared Latch serialization mechanism is applied.

For the same existing chain of elements, there is no element deletion processing other than marking the elements logically deleted. That is, the element is not usable as a valid reference on the chain, but the storage itself is not released (freed). Releasing a deleted element after it has been placed on this chain can entail releasing the element to general storage or any other installation-dependent procedure.

Any service that uses the Chain will cause the shared latch control work use count to be increased by one. When the service has completed its processing, then the shared latch control work area use count will be decreased by one, unless that service is the last one accessing the chain. The last service that has accessed the chain is obliged to check if further delete and release element processing is required.

Any list of elements that are marked for deletion, and are no longer referenced, will be placed on a delete list. This is referred to as shared latch phase I delete processing.

The first service that is attempting to complete its specific service function that would cause the control work area use count to go to zero will enter phase II of the shared latch processing. Phase II means that all elements on the delete list will be unchained from the primary list, placed on the unchained list, and removed from the delete list.

For a service that entered phase II processing, a check is again made to determine if the control work area use count would go to zero before exiting. If this will occur, then phase III shared latch processing will be entered. During this phase, any elements on the unchained list will be checked to determine if they can be moved to the free list. If an element is not part of an indirect access reference, when the element it points to on the primary list is unreferenced, then the unchained list element is moved to the free list. When the element is part of an indirect address reference, then the element will remain on the unchained list. After each element on the unchained list is processed, all elements of the free list are released of physically deleted. An alternative to moving the unchained list elements from the unchained list to the free list would be to free the list elements as they are removed from the unchained list.

FEATURES AND ADVANTAGES OF THE PRESENT INVENTION

The present invention replaces the "off-the-primary-chain-indicator" by using a new anchor pointer to represent list elements "dequeued" or removed from the primary list and eligible to be released.

The new process also adds a new anchor pointer to represent list elements "dequeued" or removed from the primary list and not yet eligible to be released. The list elements placed on this new chain are no longer part of the primary list, but still have an association with elements on the primary list. The association of the two list elements is derived from the indirect addressing that is used by services that are accessing the primary list.

The mechanism described in conjunction with the present invention is applied to an existing linked-list that has no explicit serialization for the deletion of an element. Since the deletion of an element was changing from a logical deletion to a "physical deletion", the primary list must be serialized for deletions. Accesses to the list are organized in a way such that a single service determines the nature of the access request and invokes a specific service to perform the function request. This common service point will cause the list's control structure work area count to be increased by 1 for any specific service request that could potentially scan (or run) the primary list chain.

In addition to the special anchor pointers listed above, the new approach provides a general "exception" mechanism for the use count reaching and exceeding a maximum value. If a list element's reference (access) count reaches the maximum alotted by the data structure, then the event is indicated in the list element. If this same list element is then marked for deletion, then the element will not be eligible to be released (freed). The item will be removed from the primary chain (list) and will be placed on an UNCHAINED Q. Even though the storage cannot be reclaimed, the primary chain will not contain an "unusable" element. The expected performance of running the primary chain will be improved with this technique verses leaving the element on the chain and causing an extra element to be accessed and interrogated for each pass through the list. This addition was necessitated due to the given size of the list element count field already being defined at 2 bytes, or half a word.

The foregoing and other objects, features and advantages of the invention will be apparent from the following more particular description of preferred embodiments of the invention, as illustrated in the accompanying drawings.

BRIEF DESCRIPTION OF DRAWINGS

The invention will be better understood if reference is made to the accompanying drawings in which.

BEST MODE FOR CARRYING OUT THE INVENTION

Figure 1:
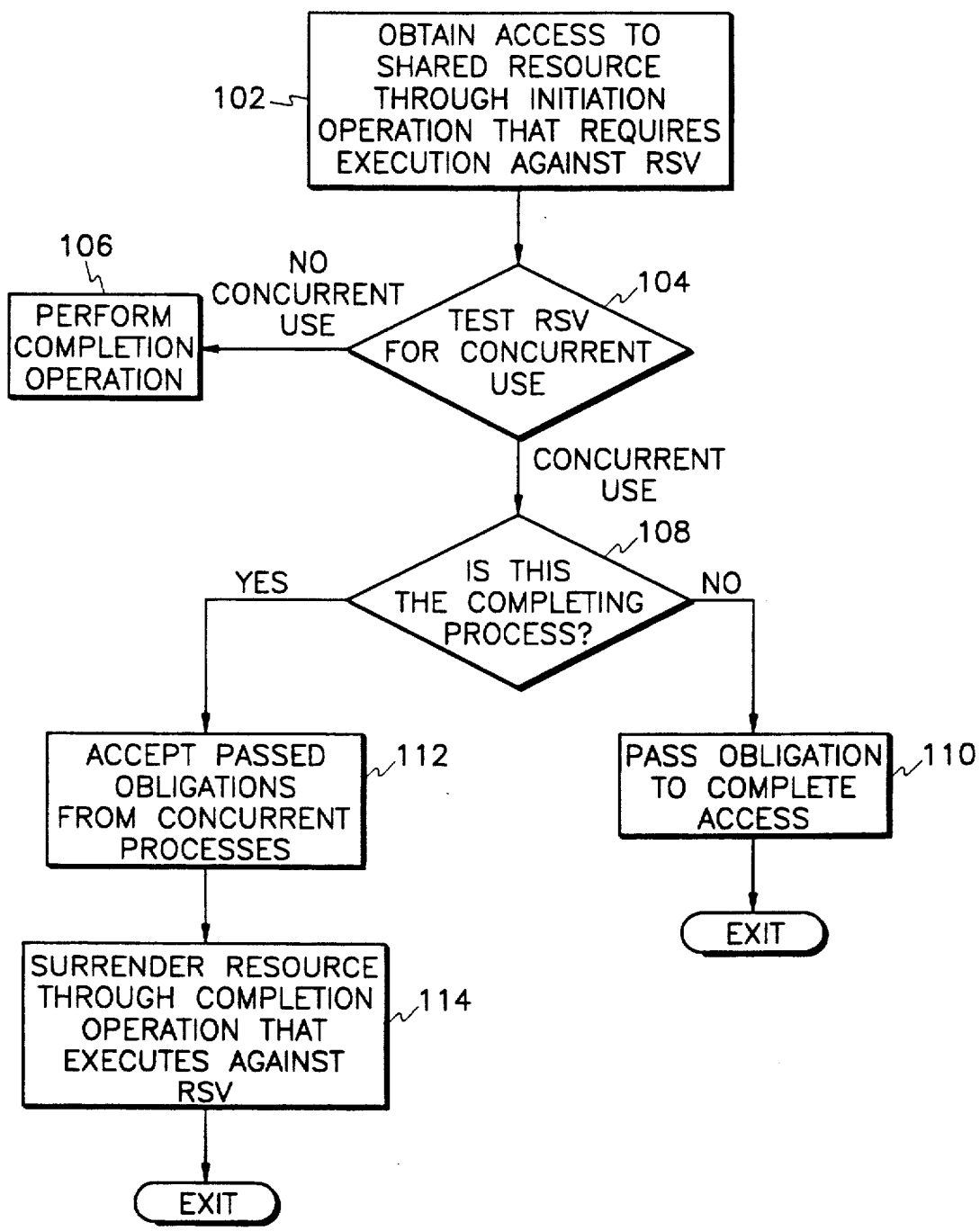
FIG. 1 depicts a flow diagram that summarizes the conventional lock-free method.

The present invention is an enhancement to the Shared-Latch serialization which handles the deletion of elements from a chain even when there is a direct association between consecutive elements on the chain. The original Shared Latch serialization processing described in the "Related Prior Art" section of the '754 patent does not accommodate this relationship between elements of a chain.

An example of an association between consecutive elements of a chain may be in the addressing of an element. A reference to an element of the chain may be through direct or indirect addressing. Direct addressing is used when the actual address of the chain element is used to reference the element. Indirect referencing is used when the address used to reference the element is actually an address to a field which contains the address of the element. In this case, the field that contains the address of the requested element is the previous element's "chain-next" field.

When both direct and indirect addressing is allowed on the chain, then consecutive elements have an association in that the previous element on the chain may be used to indirectly reference the next element. For this type and similar types of associations between consecutive elements on the chain, the deletion process through the Shared Latch serialization had to be modified.

The following terms are used in the below description of the enhanced Shared Latch processing. A "Chain" is a list of elements and is commonly referred to in the art as a linked list. In the below description, the terms primary list, primary chain, original chain and Chain will be used interchangeably to refer to the main list of the linked elements.

An exemplary data structure for an element is shown in Table 1 and will be described further below. Any process request (also called services or functions) making a reference on the Chain will increment the "chain count" or "Count". Hence, the chain count reflects the number of processes currently having access to the Chain to either modify or traverse elements that comprise it.

A delete queue ("Del Q") is a queue that lists any Chain elements that have been marked "ready to be deleted." Typically these elements are marked as logically deleted and have no current outstanding references to any Chain element. The elements are added at the head of this list.

An "Unchained Q" is a queue that lists each of the elements on the Del Q that are unchained from the Chain, but have indirect addressing to a successor. Elements are placed at the head of the Unchained Q. Elements on this list are not yet eligible to have their storage returned or reused. The Unchained Q is unique to the processing of the present invention, because elements are unchained from the Chain, but are not yet eligible to be freed.

A "Free Q" is a queue that lists elements on the Del Q that are unchained from the Chain and do not have any indirect addressing to other elements of the list. Elements are placed at the head of the Free Q. Elements on this list are eligible to have their storage returned or reused.

A more detailed description of some of the basic concepts discussed in this section is found in a number of references, including "An Introduction to Database Systems", Vols. I and II, by C. J. Date (Addison-Wesley Publishing Company, Inc., 1990).

Figure 2:
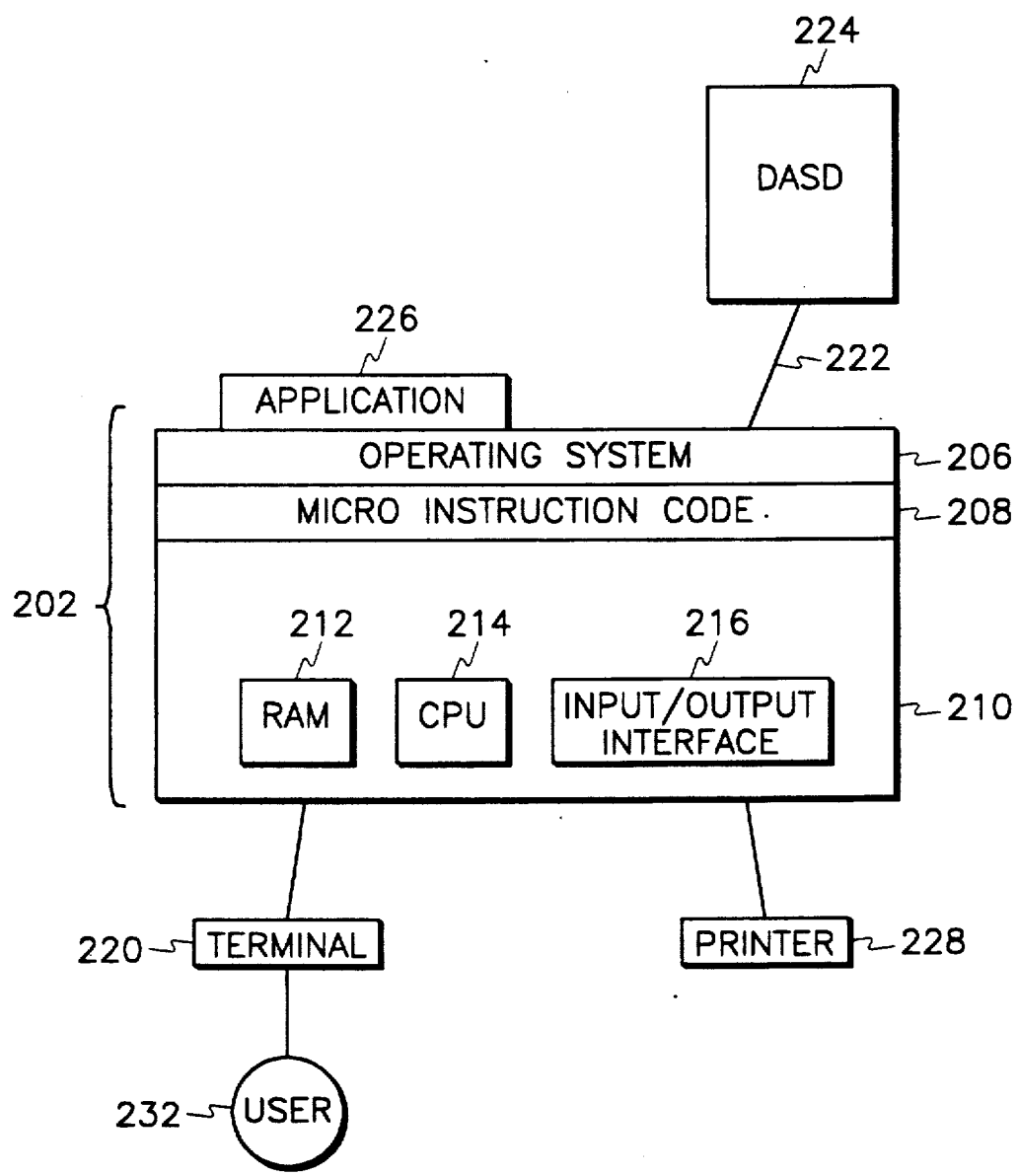
FIG. 2 illustrates a hardware block diagram in conjunction with the present invention.
Figure 3:
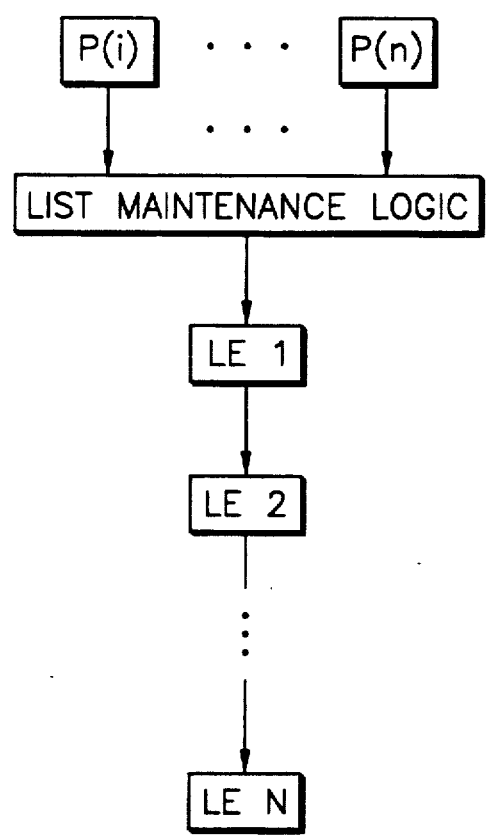
FIG. 3 illustrates a method which provides concurrent lockfree, serialized access to a linked list for multiple processes in conjunction with the present invention.

An example of an environment depicting a hardware implementation in conjunction with the present invention for providing two or more contending processes with concurrent access to a shared resource having a primary list of elements with direct association between elements is shown in FIG. 2. A computer platform 202 (an individual processor or engine) includes a hardware unit 210, which includes a central processing unit (CPU) 214, a random access memory (RAM) 212, and an input/output interface 216. The RAM 212 is also called a main memory.

The computer platform 202 may include a micro instruction code 208 (or a reduced instruction set, for example), and an operating system 206. A direct access storage device (DASD) 224 represents a resource shared by the competing processes. The shared data storage device 224 is also called a secondary storage and may include hard disks and/or tape drives and their equivalents.

Various peripheral components may be connected to the computer platform 202, such as a terminal 220, and a printing device 228. The operating system may use virtual memory and manage all paging. A user 232 can interact with the computer platform 202 via a terminal 220.

The list management system of the present invention may be part of the operating systems 206 or may be implemented in application software 226. The present invention is not limited to the operating system an application domains.

In a preferred embodiment of the present invention, the computer platform 202 includes a computer having an IBM System 390 architecture. The operating system 206 which runs thereon is an IBM Multiple Virtual Storage (MVS/ESA V4; see IBM Enterprise System Architecture Principles of Operation, Publication SA 22-7200-0, for example). Those versed in the art will be familiar with many equivalents to the above examples.

Table I shows data structure memory maps of: (1) a list's shared latch control work area, and (2) a serialized list element used in conjunction with the present invention.

TABLE I

| Data Areas Used | | | |
|---|---|---|---|
| Map of the List's Shared Latch Control Work Area | | | |
| SLW | DS | 0F | Shared Latch Control Work Area |
| SLWANCH | DC | A(0) | Anchor for primary list |
| SLWCNTL | DS | 0D | Two word area for CDS instructions |
| SLWCOUNT | DC | F'0' | Number of Services accessing primary list |
| SLWDELQ | DC | A(0) | Anchor for pending deletes |
| SLWUNCHN | DC | A(0) | Anchor for list elements removed from primary list but not yet eligible to be released (freed) |
| SLWFREEQ | DC | A(0) | Anchor for list elements eligible to be released (freed) |
| Map of the Serialized List Elements | | | |
| LESTART | DSECT | | Primary List Element Mapping |
| LEPNEXT | DS | F | Pointer to next primary list element |
| LEANEXT | DS | F | Pointer to next alternate list element. This field is used on SLWDELQ chain, SLWFREEQ chain, and on SLWUNCHN chain. |
| LECHNID | DS | XL16 | List Element Identification |
| LEFLAGS | DS | 0F | List Element serialization word |
| LEFLAG1 | DS | XL1 | Flag Byte, Reserved |
| LEFLAG2 | DS | XL1 | Flag Byte |
| LELDEL | EQU | X'40' | List Element is logically deleted - field can change dynamically |
| LEMAXED | EQU | X'08' | List element use count exceeded maximum value. The element will never be available for reuse - field can change dynamically |
| LEUSECT | DS | XL2 | Use Count - indicates number of active uses on this |

TABLE I-continued

| Data Areas Used | | | |
|---|---|---|---|
| LEDATA | DS | C | element Data begins here. |

The data structure for the shared latch control work area shown in Table I comprises seven fields. The following is a discussion of selected fields to aid in the later discussion of the method of operation of the present invention. The SLW field stores the location of the Shared Latch Control Work Area itself. The SLWANCH field stores an anchor pointing to the first element of the primary list (also referred to as the main Chain). As another element is added to the chain, the new added element is made to point to the element previously pointed to by the SLWANCH anchor, and the SLWANCH anchor is switched to point to the new element, and so forth.

The SLWCOUNT field stores a counter which counts the number of processes accessing the primary list. The SLWDELQ field stores an anchor pointing to the first element in a list of elements that have been marked by a contending process as "ready to be deleted". This pointer is called the Del Q anchor. As another element is marked "ready to be deleted", is made to point to the element previously pointed to by the Del Q anchor, and the Del Q anchor is switched to point to the new element, and so forth.

The SLWUNCHN field stores an anchor pointer to the first element of a list of elements removed from the primary list, but not yet eligible to be released. This pointer is called the Unchained Q anchor. Another anchor, called the Free Q anchor, is stored in the SLWFREEQ field, and points to the first element of a list of elements eligible to be released. Elements added to these two lists are added in the same fashion elements are added to the Del Q list.

The data structure for the list elements themselves comprises eleven fields. The primary fields of interest are as follows. A chain queue pointer LEPNEXT points to the next element in the primary chain or the chain-next pointer. A use count LEUSECT indicates the number of active uses on the element, i.e., the number of processes accessing this element. The LEANEXT field stores a pointer to next alternate list element. This field is used on SLWDELQ chain, SLWFREEQ chain, and on SLWUNCHN chain.

As mentioned previously, the present invention has been developed to permit shared latching in a system in which a special relationship exists between consecutive elements on the chain. In this system, a function is used to access a particular element in the chain by sending a pointer to the chain next field of the element preceding the element to be accessed. This function essentially accesses two elements. This technique is called indirect accessing.

The present invention addresses a problem that arises because of the special relationship at phase II of conventional shared latch serialization when the function deleting elements attempts to unchain those elements from the original chain. The Unchained Q is added to alleviate the problem. The Unchained Q links elements unchained from the original queue chain, but are not ready to be freed, i.e., not ready to be added to the Free Q.

The indirect reference to the next element prevents an element to be deleted from being placed on the Free Q until all further elements accessing the next element are done. Thus, the element to be deleted is considered "referenced" until all further elements accessing the next element are done. The element to be deleted is then marked "unreferenced" and it can be added to the Free Q. The Unchained Q comprises the unchained anchor pointer SLWUNCHN for pointing to the most recent element that has been removed from the Chain, but which has not yet been unreferenced.

The process passed the responsibility of freeing elements must look to the Unchained Q to check whether unchained elements have been unreferenced. Any unreferenced, unchained elements are added to the Free Q by that process.

Without the Unchained Q, any request by a process to an element indirectly pointed to by a now deleted element would fail.

Figure 4:
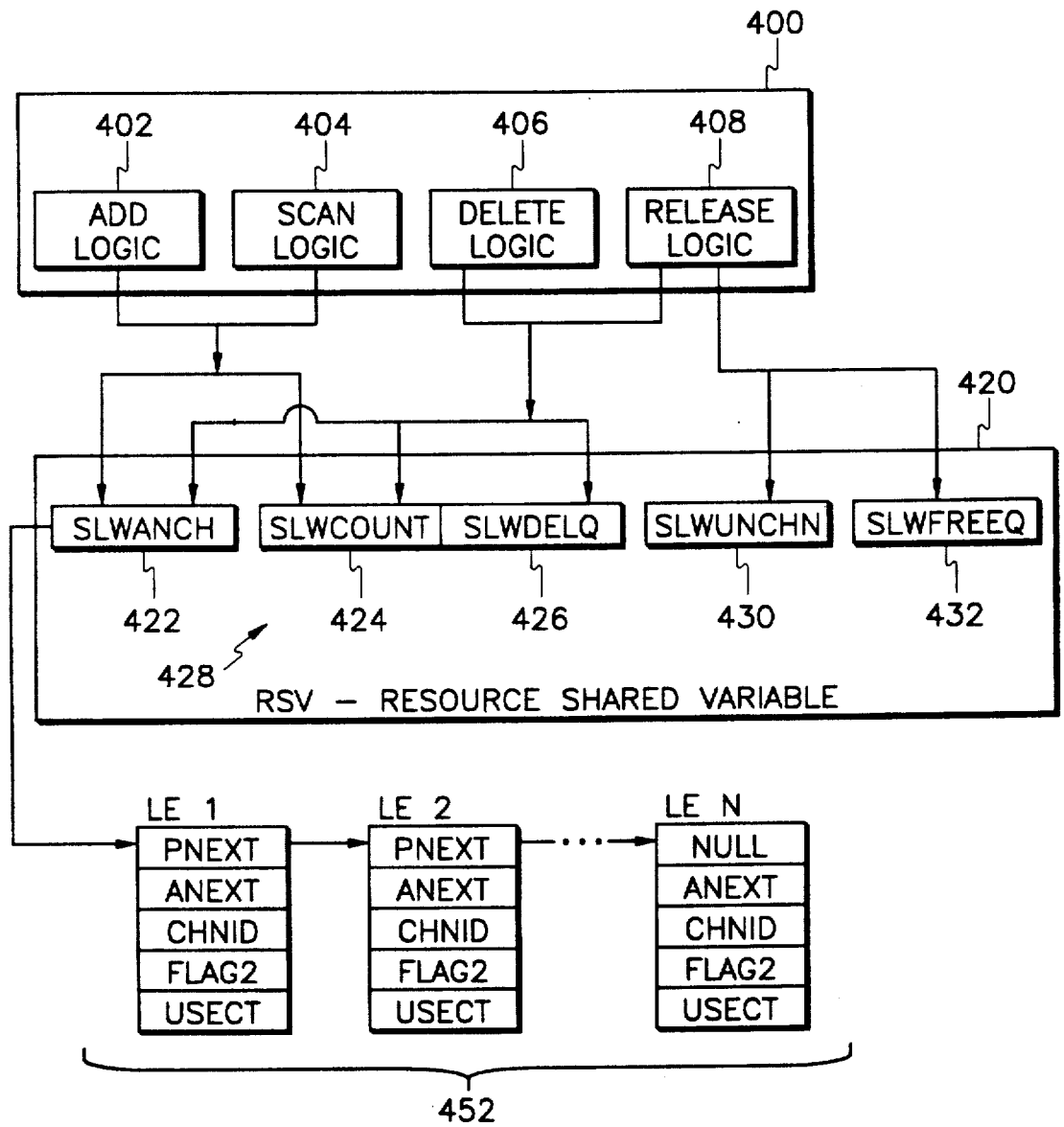
FIG. 4 depicts the relationship between the list access logic of FIG. 3 and a resource status variable in conjunction with the present invention.

FIG. 4 depicts the relationship between the list access logic 400, including add logic 402, scan logic 404, delete logic 406 and release logic 408, a resource status variable (RSV) 420 and a list of elements LE 1-N shown at reference numeral 452. The below discussion of the present invention will focus on the delete and release logic only. A discussion of the add and scan logic may be found in the '754 patent and the other referenced material. The add and scan logic is conventional and their operation is well known to those skilled in the art.

The RSV 420 comprises the primary list anchor SLWANCH, the primary list counter SLWCOUNT, the Del Q anchor SLWDELQ, the Unchained Q anchor SLWUNCHN, and the Free Q anchor SLWFREEQ, shown at 422, 424, 426, 430 and 432, respectively. The primary list counter SLWCOUNT and the Del Q anchor are shown as located on a double word boundary at 428. Note that the primary list anchor SLWANCH points to the first list element LE 1, and the PNEXT pointers of the list elements point to the next successive element in the list. The PNEXT pointer of list element LE N is null, indicating that LE N is the end of the list.

The following is a detailed outline of the basic steps for List Maintenance for the enhanced Shared Latch Serialization processing in conjunction with the present invention. This detailed outline is shown in the flowcharts at FIGS. 5A-C.

Any access to the Chain (see step 502) causes the chain count to be increased by one (1), as shown at step 504. Access to the chain is then granted, as shown at step 506.

2. If an element on the Chain is marked as "ready to be deleted," (LDEL set on), and there are no direct references to the element (USECT=0), then the element is added to the head of the Del Q, as shown at steps 508 and 510, respectively.

3. When the accessing of the Chain is complete, a copy of Count and Del Q anchor are obtained in preparation for the Compare Double and Swap (CDS) processing. See step 512. Then a determination is made to check if the Count is equal to one (1). See conditional step 514.

When Count is 1:
Use a CDS command to keep the Count at 1 and set the head of the Del Q to null. See conditional step 516. This operation represents entry into Phase II of the Shared Latch processing. Processing then skips to "Phase II Processing" below.

When Count is not 1 (meaning greater than 1):
Process jumps to step 6 below. See step 520 in FIG. 5C.

4. Phase II Processing.

Figure 5A:
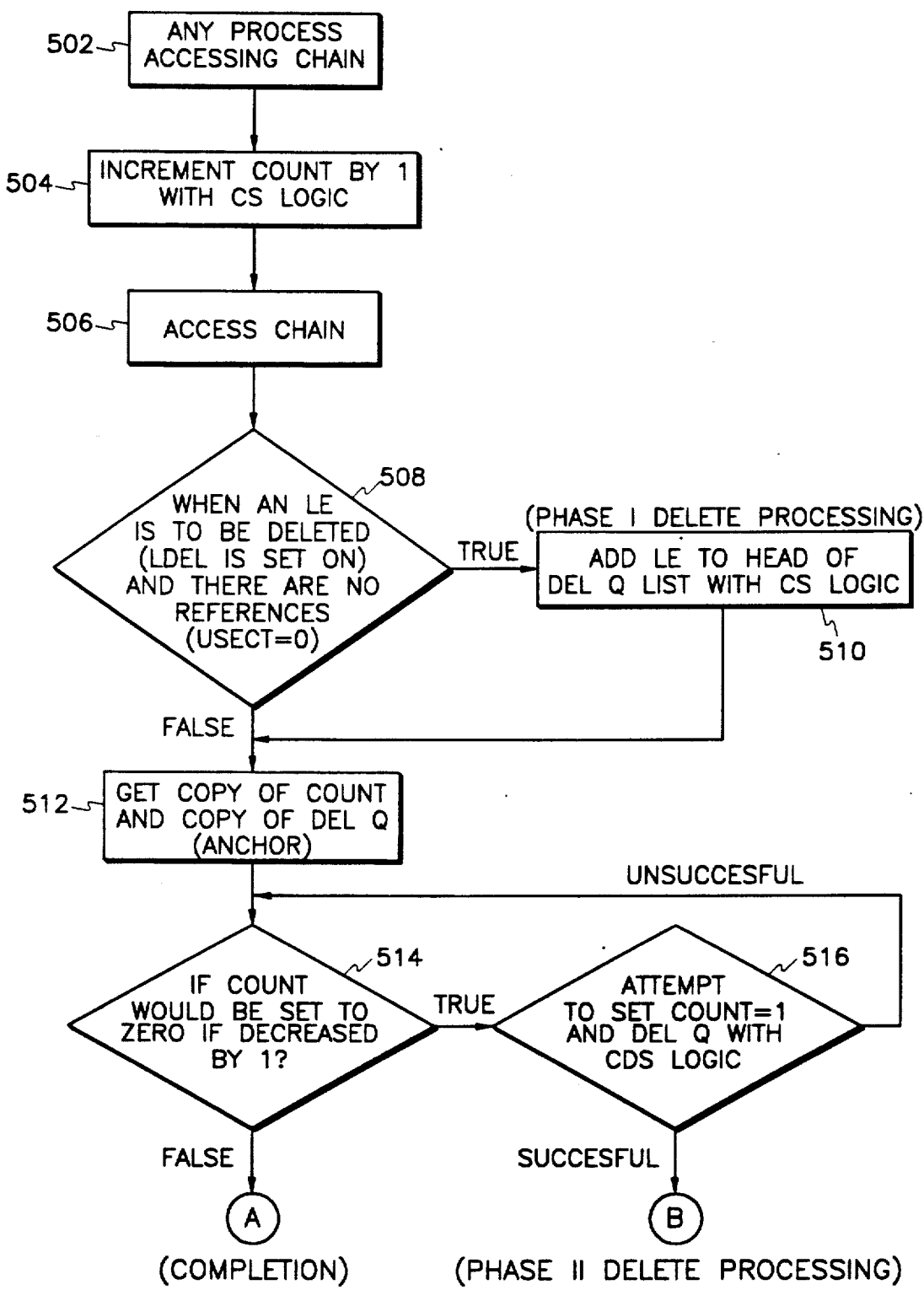
FIGS. 5A-C depict a flow diagram the demonstrates the List Maintenance Logic in conjunction with the present invention.
Figure 5B:
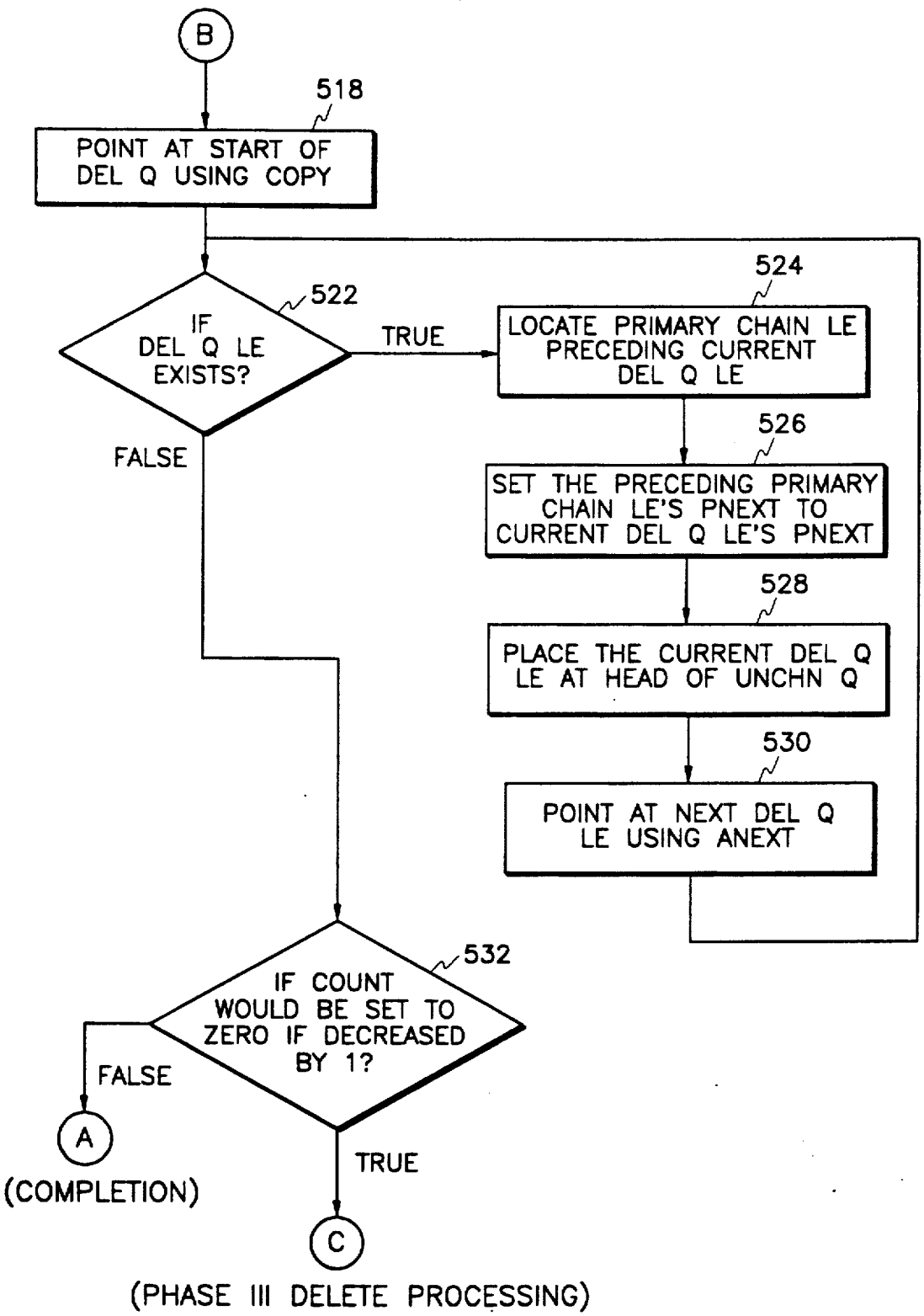
Figure 5C:
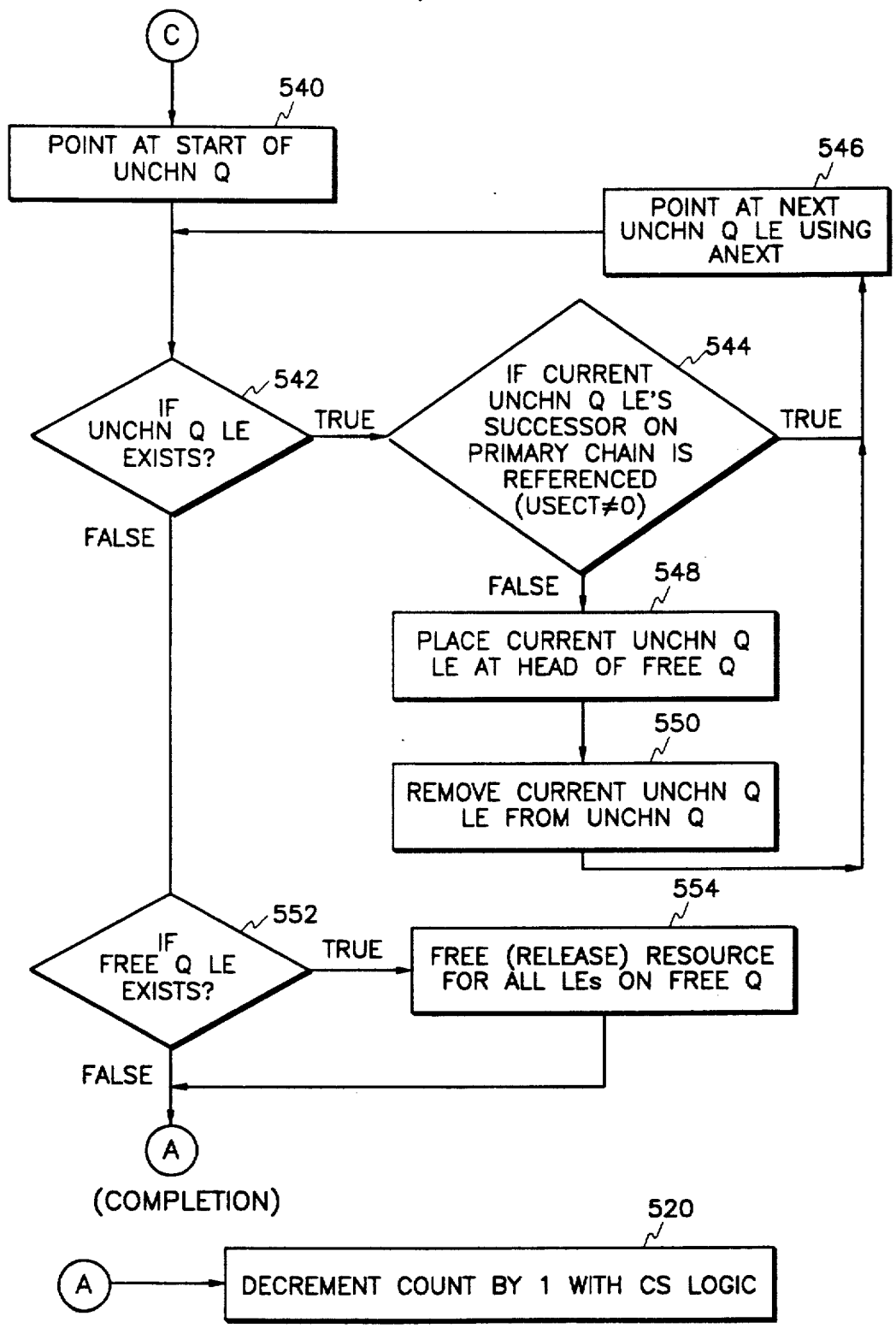

The Compare and Double Swap command on the Count and Del Q causes the Count to remain at 1 and the Del Q to be the responsibility of the current service. This is represented in FIG. 5A at steps 516 and 518.

a. For each element on the Del Q (see conditional step 522):
1) Search the primary Chain and remove the current Del Q element from the Chain.
a) Locate the Chain element prior to the current Del Q element.
b) Set the prior Chain element's primary chain-next pointer to the value in the current Del Q element's primary chain-next pointer. (The current Del Q element is now unchained from the primary chain). See steps 524 and 526, respectively.
2) Place the current Del Q element at the head of the Unchained Q. See step 528.
3) Skip to the next Del Q element. See step 530.
b. When the Del Q is empty a determination is made to check if the Count is still equal to one (1). See step 532.
When Count is 1:
Enter Phase III of the Shared Latch processing. Skip to "Phase III Processing" below, which is shown in FIG. 5C.
When Count is not 1 (meaning greater than 1):
Decrement the Count and the processing is complete until another access of the Chain is attempted. See step 520.

5. Phase III Processing.

The fact that the Count was one (1) while checked in Phase II causes entry into Phase III processing, as shown at step 540 of FIG. 5C.

a. For each element on the Unchained Q (see conditional step 542):
If the association between the current Unchained Q element and its original successor on the Chain still exists, (see "TRUE" condition at step 544), e.g., the successive element is being referenced so the indirect addressing is still in effect (USECT of the indirectly referenced element is ≠0):
Leave current Unchained Q element on the Unchained Q and continue with the next element. See step 546.
If the association between the current Unchained Q element and its original successor on the Chain no longer exists, (see "FALSE" condition at step 544), e.g., the successive element is no longer referenced so the indirect addressing is no longer required from the current Unchained Q element (USECT=0):
1) Place the current Unchained Q element at the head of the Free Q. See step 548.
2) Remove the current Unchained Q element from the Unchained Q. See step 550.
b. For each element on the Free Q (see conditional step 552):
1) Remove the current Free Q element from the Free Q. See step 554.
2) Return the Free Q elements resource. See step 556.

6. Decrement the Count by 1 and the processing is complete until another access of the Chain is attempted. See step 520.

Figure 6:
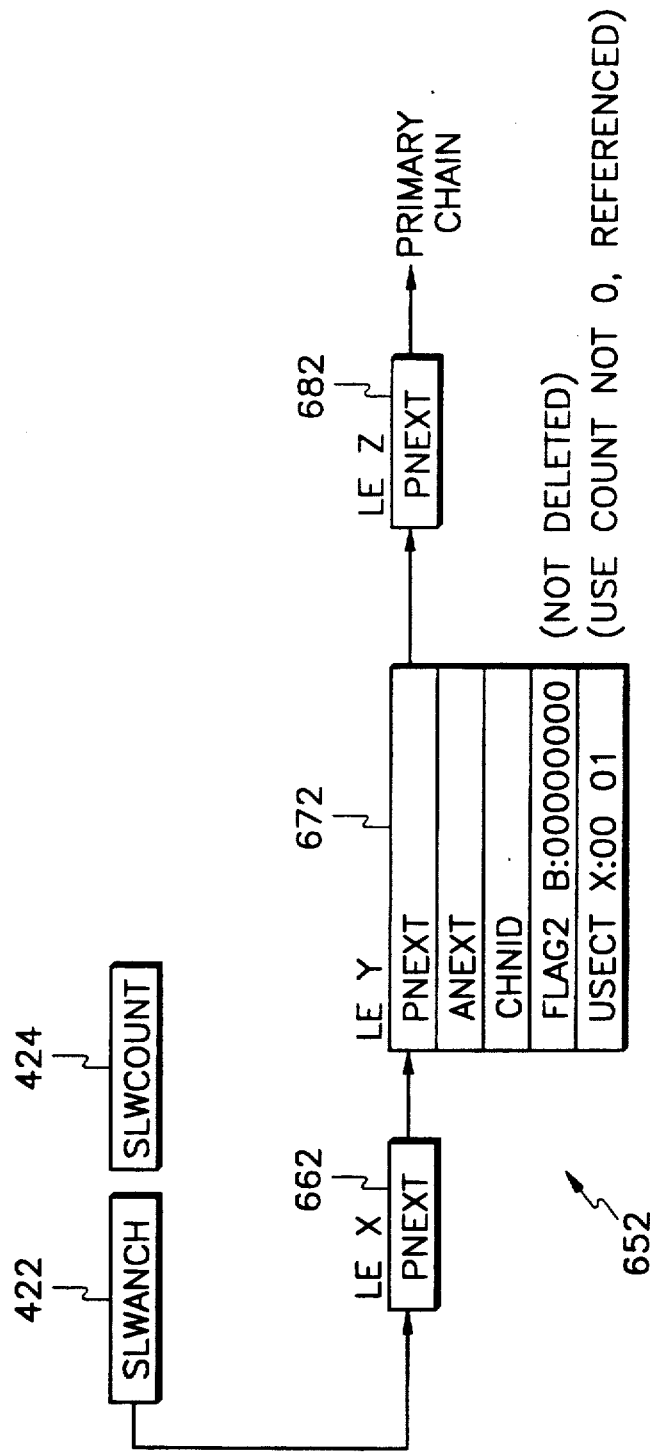
FIGS. 6-10 depict the alteration of the list according to the embodiment in conjunction with the present invention.
Figure 11:
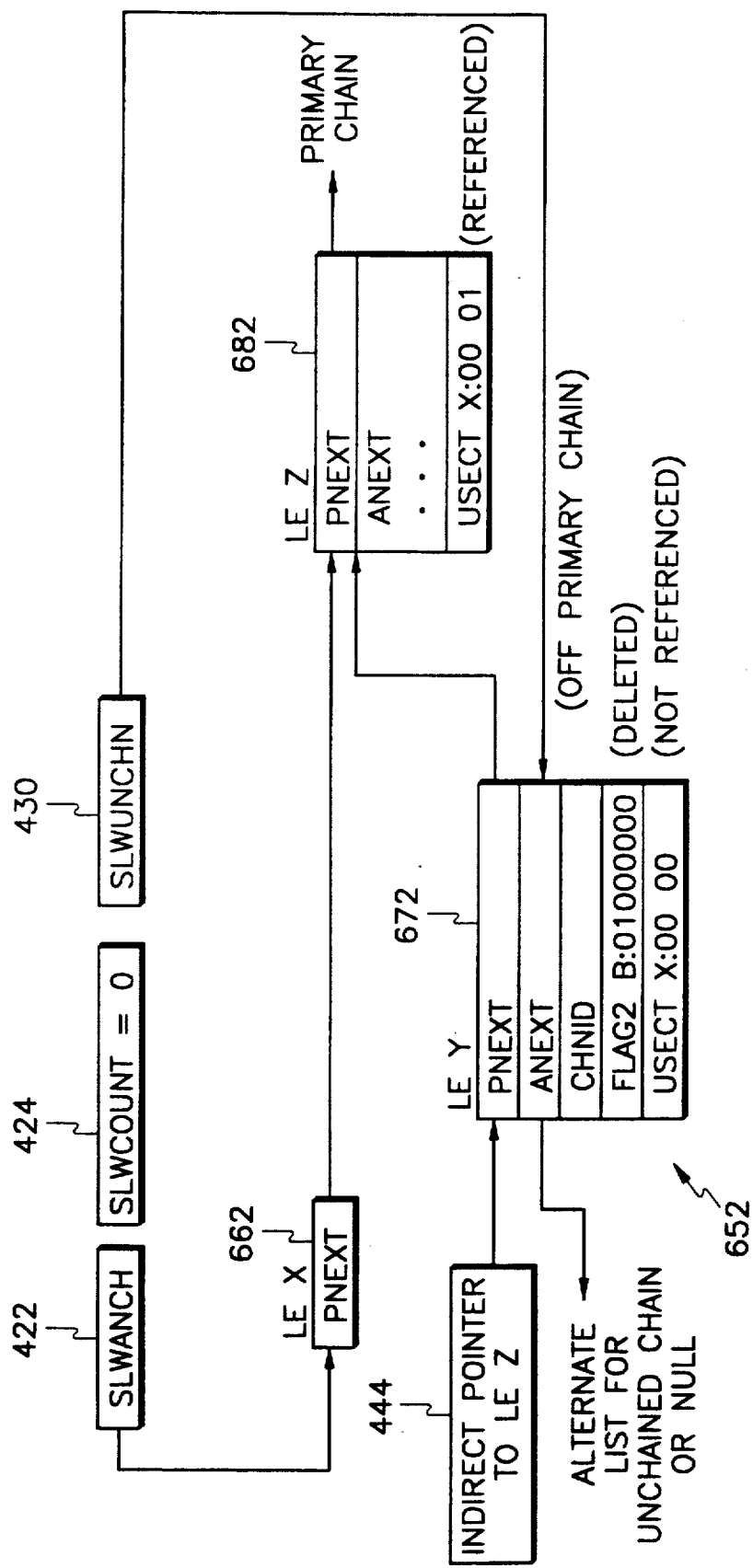
FIGS. 11-13 depict operations performed on the list elements according to the embodiment in conjunction with the present invention.
Figure 12:
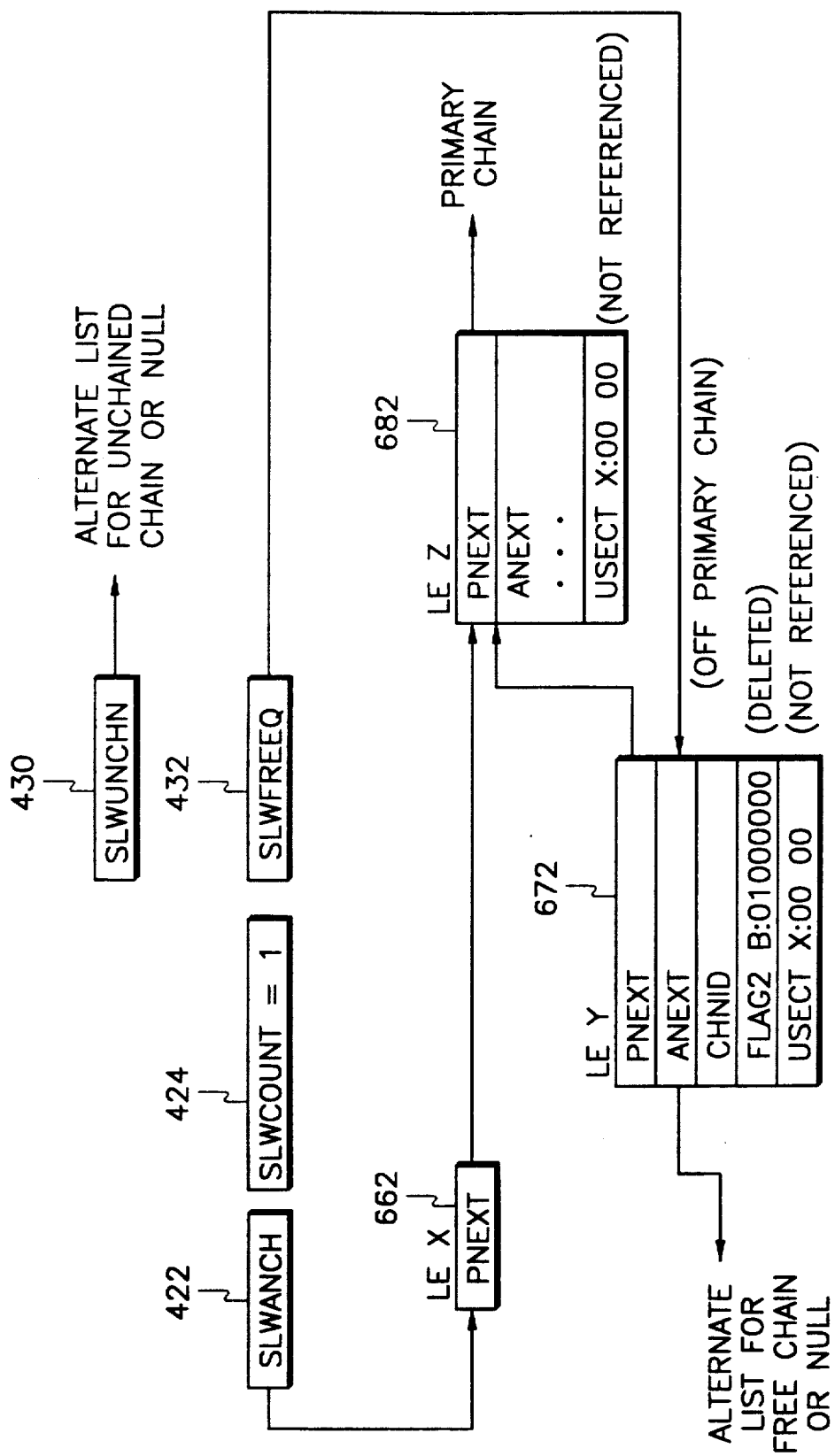
Figure 13:
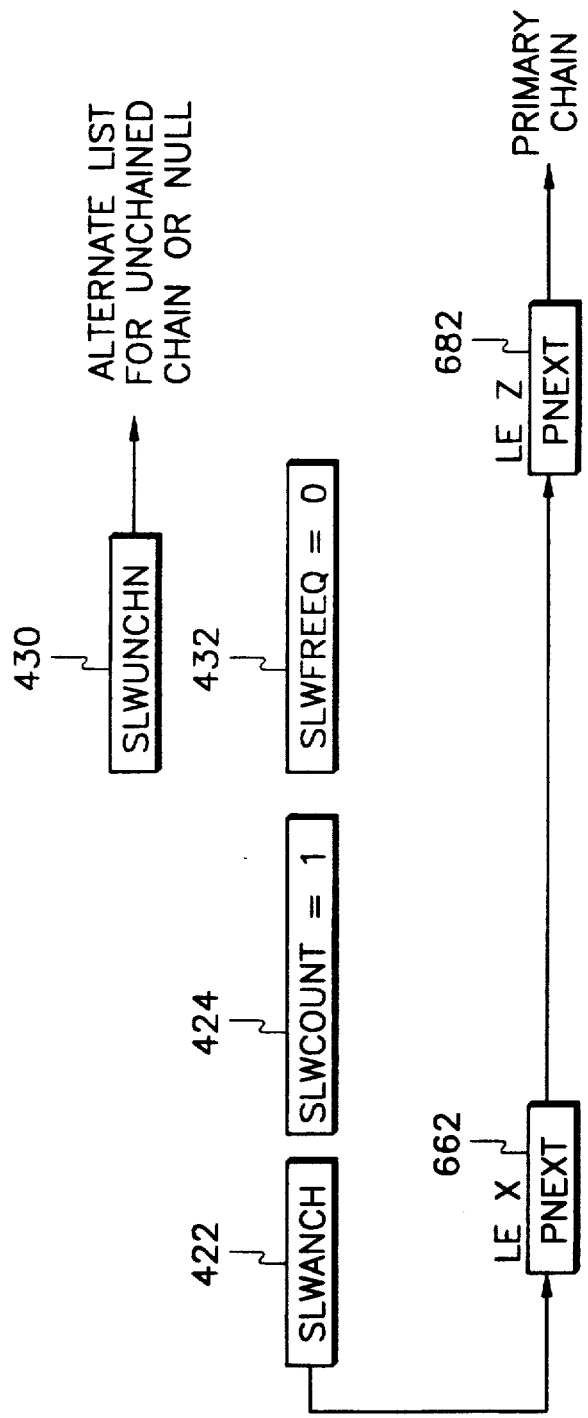

FIGS. 6-13 illustrate an example in which concurrent access is granted to a list 652, as shown in FIG. 6. The list 652 is represented by its first three elements, indicated by reference numerals 662, 672, and 682. FIG. 13 illustrates the list 652 after the list element 672 has been released or freed. The elements 662-682 are conventionally linked in a primary chain through the pointers contained in the PNEXT fields.

In the discussion following, the list element 672 is identified for use by a scan processing operation (FIG. 6), is marked for deletion by a delete processing operation (FIG. 7), becomes no longer referenced by initial scan processing operation and is added to the delete list (FIG. 8), is unchained from the primary list and added to the unchained list (FIGS. 9, 10 and 11), is moved from the unchained list to the free list (FIG. 12), and then is finally freed from the secondary chain by performance of a passed obligations (FIG. 13).

FIG. 6 depicts the accessing of list element 672 and obtaining a reference to the element for later processing. Since list element 672 is not being deleted, and it is assumed that no other elements were recently deleted, the completion processing will not have any special phase II or phase III delete processing to perform.

Figure 7:
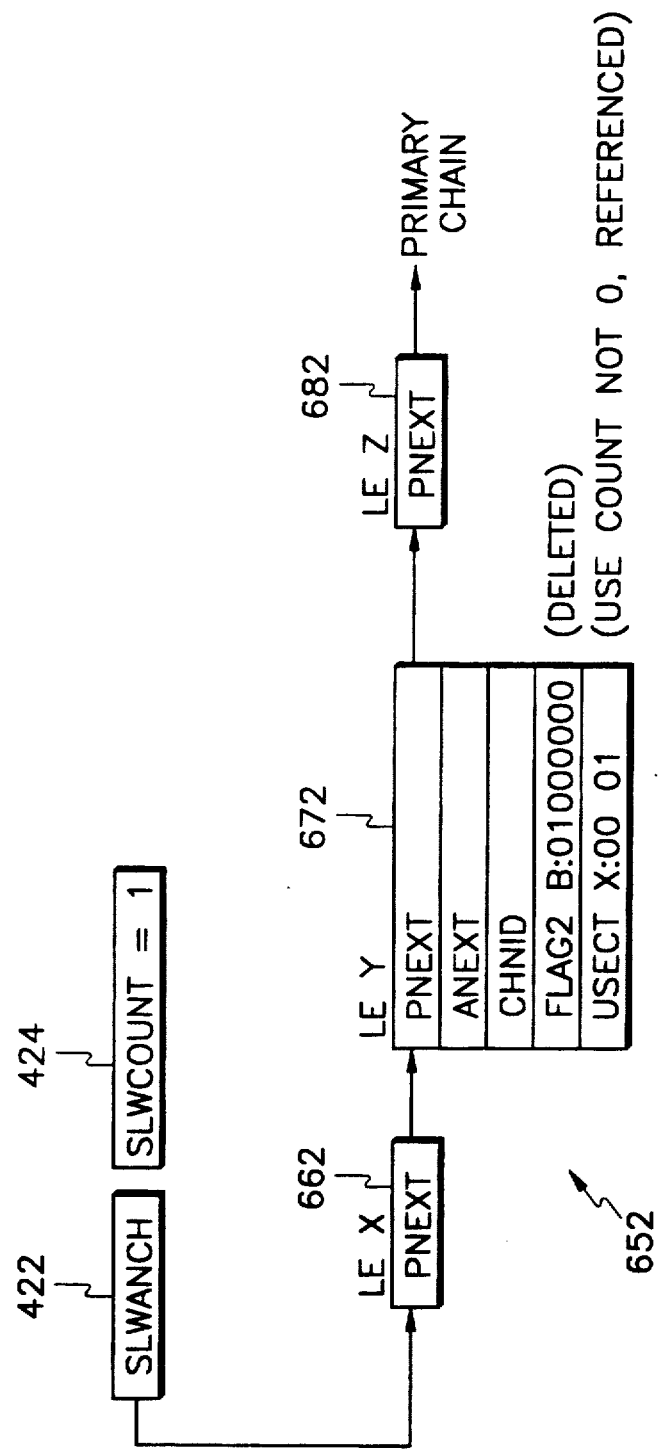

FIG. 7 illustrates the list element 672 after a delete processing operation marks the element as logically deleted. No new references to the element can therefore be obtained. Note that even when the delete processing operation performs the list maintenance logic processing and the SLWCOUNT is at 1, the list element 672 cannot be entered into shared latch phase I delete processing because there are still outstanding references to the element (USECT≠0).

Figure 8:
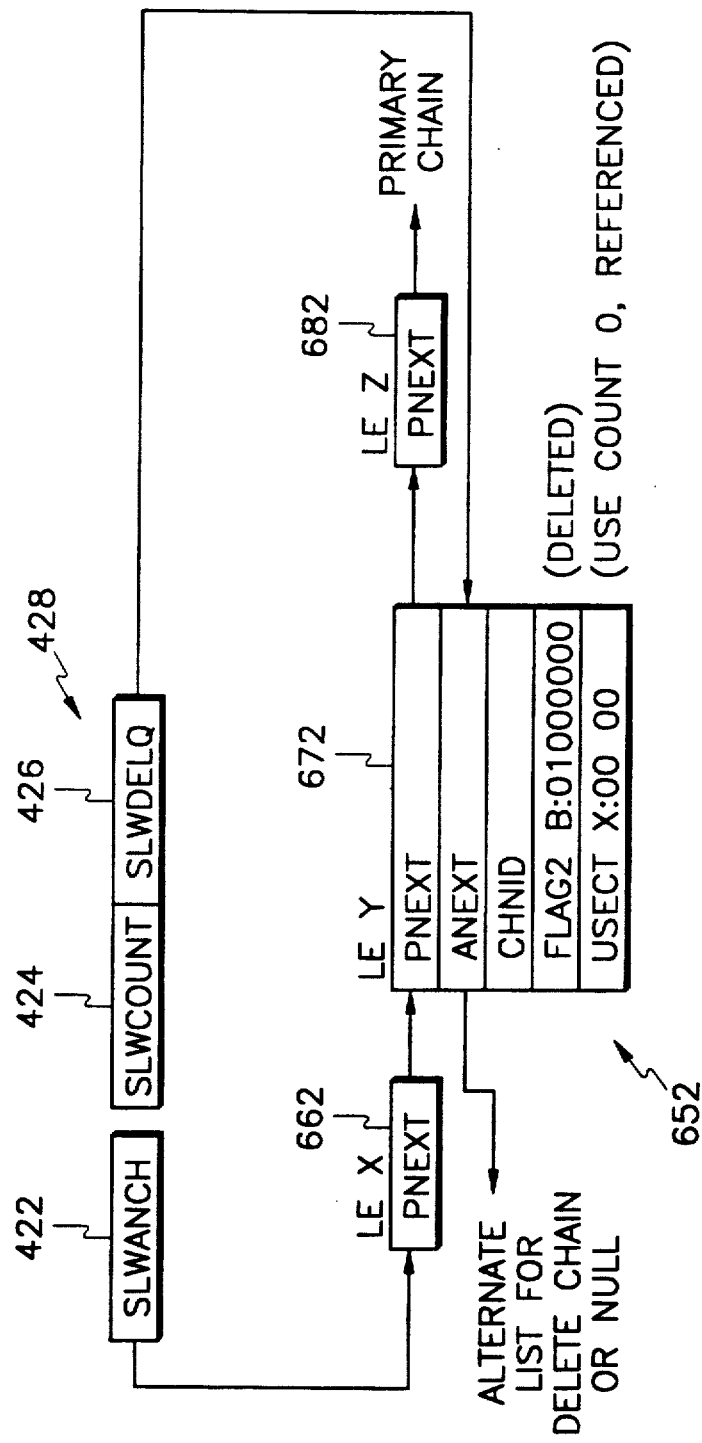

FIG. 8 demonstrates the result of the list element no longer being referenced, given the operations described in FIGS. 6 and 7 occurred. List element 672 is marked as no longer reference (USECT=0) and the element was already marked for deletion, refer to FIG. 7. It is possible that other unreferenced list elements may have been marked for deletion by other process operations concurrent with the process operations described above. These other deleted list elements would be placed on the Del Q (SLWDELQ 426) list along with list element 672. If list element 672 was the last element placed on the Del Q, then it would be at the top of the list, and would be pointed to by SLWDELQ.

Figure 9:
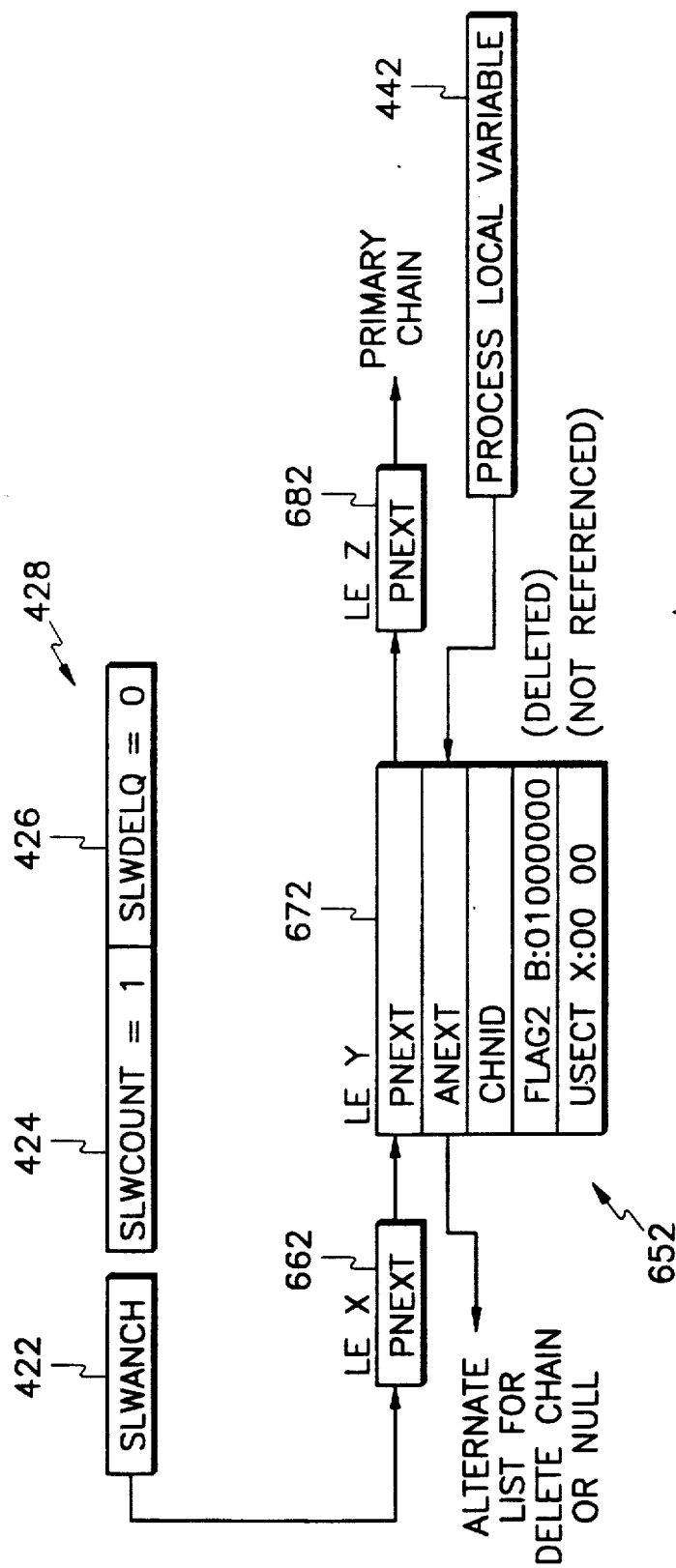

FIG. 9 illustrates the status of the resource status variable 428 and the list element 672 when a process operation has received the obligation of continuing the completion process. The SLWCOUNT field 424 is at 1 and the SLWDELQ field 426 gets set to zero (0). A local variable pointer field 442 contains the anchor to the Del Q. List element's 672 ANEXT field may point to another list element ready to be processed by phase II delete processing. The list elements on the Del Q will be unchained from the primary list 422 and added to the Unchained list 430.

Figure 10:
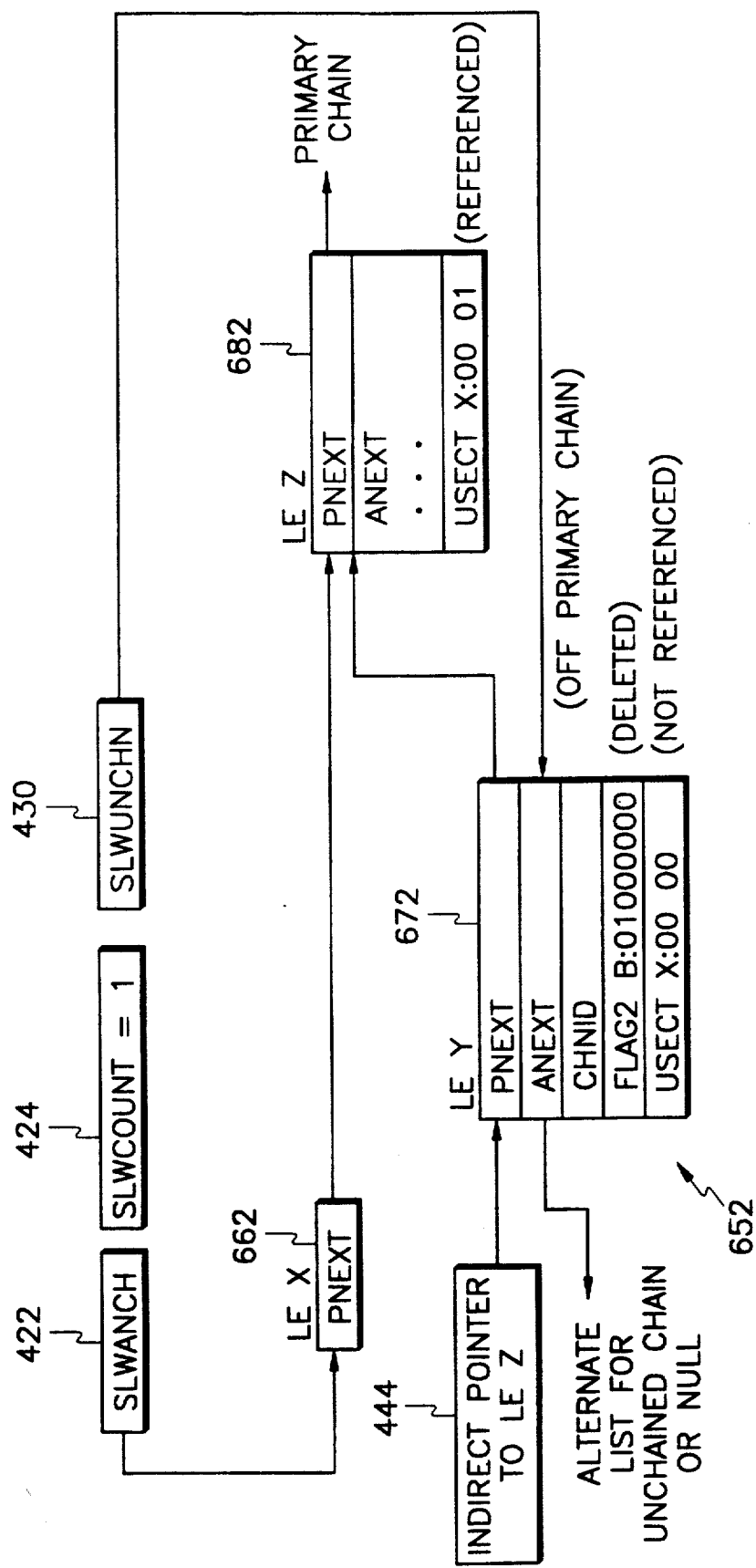

FIG. 10 demonstrates the status of the resource status variable 428 and the list element 672 when a process operation has completed phase II delete processing and must now enter into phase III delete processing. If the SLWCOUNT field were not at 1, meaning the other processes were accessing the primary list, then the obligation of phase III delete processing would be passed to the next process that encountered a SLWCOUNT of 1.

List element 672 still points to list element 682 (PNEXT). The USECT of list element 682 is non-zero, so there is an outstanding reference to list element 682. Because of this outstanding reference, list element 672 cannot be freed. The indirect pointer 444 has an address that is contained within list element 672.

If list element 672 were freed at this point, any future references to list element 682 via the indirect addressing would fail, or worse, cause unpredictable results.

List element's 672 ANEXT field may point to another list element ready to be processed by phase III delete processing. The list elements in this list had already been placed on the Del Q 426, were unchained from the primary list 422, and added to the unchained list 430.

FIG. 11 is similar to FIG. 10 except that it demonstrates that even when the process operation has finished the completion processing, list elements may remain on the unchained list 430. List elements, such as 672, will remain on the unchained list until their successive primary list element no longer has any outstanding references.

FIG. 12 illustrates the first portion of phase III delete processing by moving the list element 672 from the unchained list 430 to the free list 432 because the indirect reference no longer exists, list element 682's USECT=0. It is possible for some list elements to remain on the unchained list as a result of the phase III delete processing, as demonstrated in FIG. 11. List element's 672 ANEXT field may point to another list element ready to be freed by phase III delete processing. The list elements in this list had already been placed on the Del Q 426, were unchained from the primary list 422, added to the unchained list 430, indirect addressing no longer exists for the element, and the element was moved from the unchained list 430 to the free list 432.

Finally, FIG. 13 depicts the primary list 422 after list element 672 has been completely released.

While various embodiments of the present invention have been described above, it should be understood that they have been presented by way of example, and not limitation. Thus the breadth and scope of the present invention should not be limited by any of the above-described exemplary embodiments, but should be defined only in accordance with the following claims and their equivalents.

What is claimed is:

1. A computer-based method for use in a computer platform including at least one central processing unit and a computer memory, said computer-based method for providing two or more contending processes with concurrent access to a shared computer memory resource within the computer memory, the shared computer memory resource having a primary list of elements and a list access count, with direct association between at least first and second consecutive elements each having a use counter, wherein resource access includes an obligation to perform an access completion operation, comprising the computer-based steps of:

marking the first element in the computer memory resource as ready to be deleted when a traversing one of said contending processes requests the deletion of the first element from the primary list;

placing the first element ready to be deleted on a delete list in the shared computer memory resource;

unchaining the first element from the primary list;

moving the first element from said delete list to an unchained list in the shared computer memory resource; and checking whether said list access counter is equal to zero; is so, passing the obligation to said traversing one of said contending processes to perform an access completion operation by:

determining whether the second element's use counter is equal to zero;

If so, performing one of:

releasing the first element thereby completing it deletion; and putting the first element on a free list, thereby indicating that the first element is ready to be released;

if not, decrementing the list access counter and waiting for another contending process to access the primary list;

if not, decrementing the list access counter and waiting for another contending process to access the primary list.

2. A computer-based method wherein said free list comprises a plurality of elements having been placed thereon according to the computer-based method of claim 1, said computer-based method further comprising the step of:

releasing said free list in its entirety after each element on said unchained list has been processed according to the method of claim 1.

3. A computer-based method according to claim 1, further comprising the computer-based step of:

maintaining a shared latch control work area in the computer memory, comprising the computer-based steps of:

(a) storing an anchor pointer for point to the primary list of elements, (b) storing an anchor pointer for pointing to sadi delete list, and (c) storing an anchor pointer for pointing to said unchained list of zero or more elements to be deleted, but not yet eligible to be released because of an association with an element in said primary list, and (d) storing an anchor pointer for pointing to said free list of zero or more elements eligible to be released.

4. A computer-based method according to claim 3, further comprising the steps of:

maintaining one or more data structures, each data structure corresponding to one of the elements, comprising the steps of:

(a) storing a first pointer for pointing to a next element in the primary list in the shared computer memory resource, (b) storing a second pointer for pointing to a next element iii one of said delete, unchained and free in the shared computer memory resource, and (c) storing data corresponding to that element in the shared computer memory resource.

5. A computer-based method according to claim 1, wherein said placing step further comprises the step of:

storing a delete list anchor point in the shared computer memory resource for pointing to the first element thereby placing it on said delete list.

6. A method according to claim 5, wherein said moving step further comprises the step of:

storing an unchained list anchor pointer in the shared computer memory resource for pointing to the first element, wherein the first element is not yet eligible to be released because of an association with the second element.

7. A computer-based method according to claim 6, wherein said putting step further comprises the steps of:

storing a free list anchor pointer in the shared computer memory resource for pointing to the first element thereby indicating that it is eligible to be released.

8. A computer-based method according to claim 7, further comprising the steps of:

maintaining one or more data structures in the computer memory, each data structure corresponding to one of the elements, comprising the steps of:

(a) storing a first pointer for pointing to a next element in the primary list, (b) storing a second pointer for pointing to a next element in one of said deleted, unchained and free lists, and (c) storing data corresponding to that element.

9. A computer system for providing two or more contending processes with concurrent access to a shared computer memory resource, said computer system comprising:

a shared computer memory resource having a free list, a primary list of elements and a list access counter, with direct association between at least a first and a second consecutive ones of said consecutive elements each having a use counter, and a central processing unit coupled to said shared computer memory resource, the contending processes being carried out by said central processing unit, said central processing unit having means for marking said first element as ready to be deleted upon receiving a signal from a traversing one of the contending processes, means for placing said first element ready to be deleted on a delete list in said shared computer memory resource, means for unchaining said first element from laid primary list means for moving said first element from said delete list to an unchained, and means for checking whether said list access counter is equal to zero, and if it is, then performing an access completion operation by determining whether said second element's use counter is equal to zero;

if it is, putting said first element on said free list, thereby indicating that said first element is ready to be released;

if not, then decrementing said list access counter and waiting for another contending processes to access said primary list;

if not, then decrementing said list access counter and waiting for another contending process to access said primary list.

10. A system according to claim 9 further including means for releasing all elements on said free list for use as general storage.

11. A system according to claim 9, wherein said shared computer memory resource further includes a shared latch control work area, having (a) a first anchor pointer for pointing to said primary list of elements, (b) a second anchor pointer for pointing to said delete list of zero or more elements to be deleted, and (C) a third anchor pointer for pointing to said unchained list of zero or more elements to be deleted, but not yet eligible to be released because of an association with an element in said primary list, and (d) a fourth anchor pointer for pointing to said free list of zero or more elements eligible to be released.

12. A system according to claim 11, wherein said shared computer memory resource further includes one or more data structures, each data structure corresponding to one of said elements, each of said data structures having a second pointer for pointing to a next element in one of said unchained, deleted and free lists, and data corresponding to that element.

13. A system according to claim 9, wherein said means for placing further comprises:

a delete list anchor pointer for pointing to said first element thereby placing it on said delete list.

14. A system according to claim 13, wherein said means for moving further comprises:

an unchained list anchor pointer for pointing to said first element, wherein said the first element is not yet eligible to be released because of an association with said second element.

15. A system according to claim 14, wherein said means for putting further comprises:

a free list anchor pointer for pointing to the said element thereby indicating that it is eligible to be released.

16. A system according to claim 15, further comprising:

one or more data structures, each data structure corresponding to one of said elements, each of said data structures having a first pointer for pointing to a next element in the primary list, a second pointer for pointing to a next element in one of said deleted, unchained and free lists, and data corresponding to that element.

* * * * *